United States Patent
Chinchole

(10) Patent No.: US 11,397,684 B2
(45) Date of Patent: Jul. 26, 2022

(54) COMMAND INTERFACE AND PRE-FETCH ARCHITECTURE

(71) Applicant: SanDisk Technologies LLC, Addison, TX (US)

(72) Inventor: Vijay Chinchole, Bangalore (IN)

(73) Assignee: SanDisk Technologies LLC, Addison, TX (US)

(*) Notice: Subject to any disclaimer, the term of this patent is extended or adjusted under 35 U.S.C. 154(b) by 239 days.

(21) Appl. No.: 16/682,183

(22) Filed: Nov. 13, 2019

(65) Prior Publication Data

US 2021/0141730 A1 May 13, 2021

(51) Int. Cl.
*G06F 12/0862* (2016.01)
*G06F 3/06* (2006.01)

(52) U.S. Cl.
CPC ........ *G06F 12/0862* (2013.01); *G06F 3/0604* (2013.01); *G06F 3/0659* (2013.01); *G06F 3/0679* (2013.01); *G06F 2212/6022* (2013.01)

(58) Field of Classification Search
None
See application file for complete search history.

(56) References Cited

U.S. PATENT DOCUMENTS

| 9,792,975 | B1* | 10/2017 | Hsieh | G11C 11/4096 |
| 11,029,893 | B2* | 6/2021 | Yeon | G06F 3/0611 |
| 2014/0082268 | A1* | 3/2014 | Kim | G06F 3/061 |
| | | | | 711/103 |
| 2015/0227458 | A1* | 8/2015 | Ide | G06F 12/0607 |
| | | | | 711/102 |

* cited by examiner

*Primary Examiner* — Arpan P. Savla
*Assistant Examiner* — Edmund H Kwong
(74) *Attorney, Agent, or Firm* — Morgan, Lewis & Bockius LLP

(57) ABSTRACT

A data storage system includes a memory including a plurality of memory cells; and control logic configured to receive a first data string and determine a data type of the first data string. If the first data string is a combination command, the control logic obtains a plurality of sub-commands based on the first data string. Meanwhile, the control logic receives a second data string, determines that it represents an address, and decodes the address. While decoding the address or otherwise processing the second data string, the control logic performs a system operation specified by one of the sub-commands. The control logic also performs a memory operation, specified by another of the sub-commands, on one or more of the plurality of memory cells in accordance with the decoded address.

14 Claims, 7 Drawing Sheets

| Command | Description |
|---|---|
| 302 | Read Command 1 (A2) |
| 304 | Read Command 2 (00) |
| 316 | Acquire Temperature (30) |
| 352 | Read Operation 1 + Read Operation 2 + Acquire Temperature |

Combination Command Identifiers 502 →

Command Sequences 504 →

| | |
|---|---|
| 1 | 1p Read SLC<br>CMD CMD ADDR ADDR ADDR ADDR ADDR CMD |
| 2 | 1p Read MLC<br>CMD CMD ADDR ADDR ADDR CMD |
| 3 | 2p Read SLC<br>CMD CMD ADDR ADDR ADDR CMD ADDR ADDR ADDR CMD |
| 4 | 2p Read MLC<br>CMD CMD ADDR ADDR ADDR CMD CMD ADDR ADDR ADDR CMD |
| 5 | 3p Read SLC<br>CMD CMD ADDR ADDR ADDR CMD ADDR ADDR ADDR CMD ADDR ADDR ADDR CMD |
| 6 | 3p Read MLC<br>CMD CMD ADDR ADDR ADDR CMD CMD ADDR ADDR ADDR CMD CMD ADDR ADDR ... |

Figure 5

COMMAND INTERFACE AND PRE-FETCH ARCHITECTURE

TECHNICAL FIELD

The present disclosure relates to data storage systems, and in particular, to a command interface and pre-fetch architecture.

BACKGROUND

Non-volatile memories, such as flash memory devices, have supported the increased portability of consumer electronics, and have been utilized in relatively low power enterprise storage systems suitable for cloud computing and mass storage. The ever-present demand for almost continual advancement in these areas is often accompanied by demand to improve data storage capacity. The demand for greater storage capacity in turn stokes demand for greater performance (e.g., quicker reads and writes), so that the addition of storage capacity does not slow down the memory device. As such, there is ongoing pressure to increase the capacity and the operating speed of non-volatile memories in order to further improve the useful attributes of such devices.

SUMMARY

This application describes various implementations of a command interface, disposed between various storage components, which supports improved performance by processing combined commands and pre-fetching command and address data, thereby allowing for parallel processing of sequentially received data. Various implementations of systems, methods and devices within the scope of the appended claims each have several aspects, no single one of which is solely responsible for the desirable attributes described herein. Without limiting the scope of the appended claims, some prominent features are described. After considering this discussion, and particularly after reading the section entitled "Detailed Description" one will understand how the features of various implementations are used to improve performance at the interface link while accounting for capacitance (or loading), power, and noise limitations.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIG. 5 is a diagram depicting combination commands in accordance with some embodiments.

Figure 1:
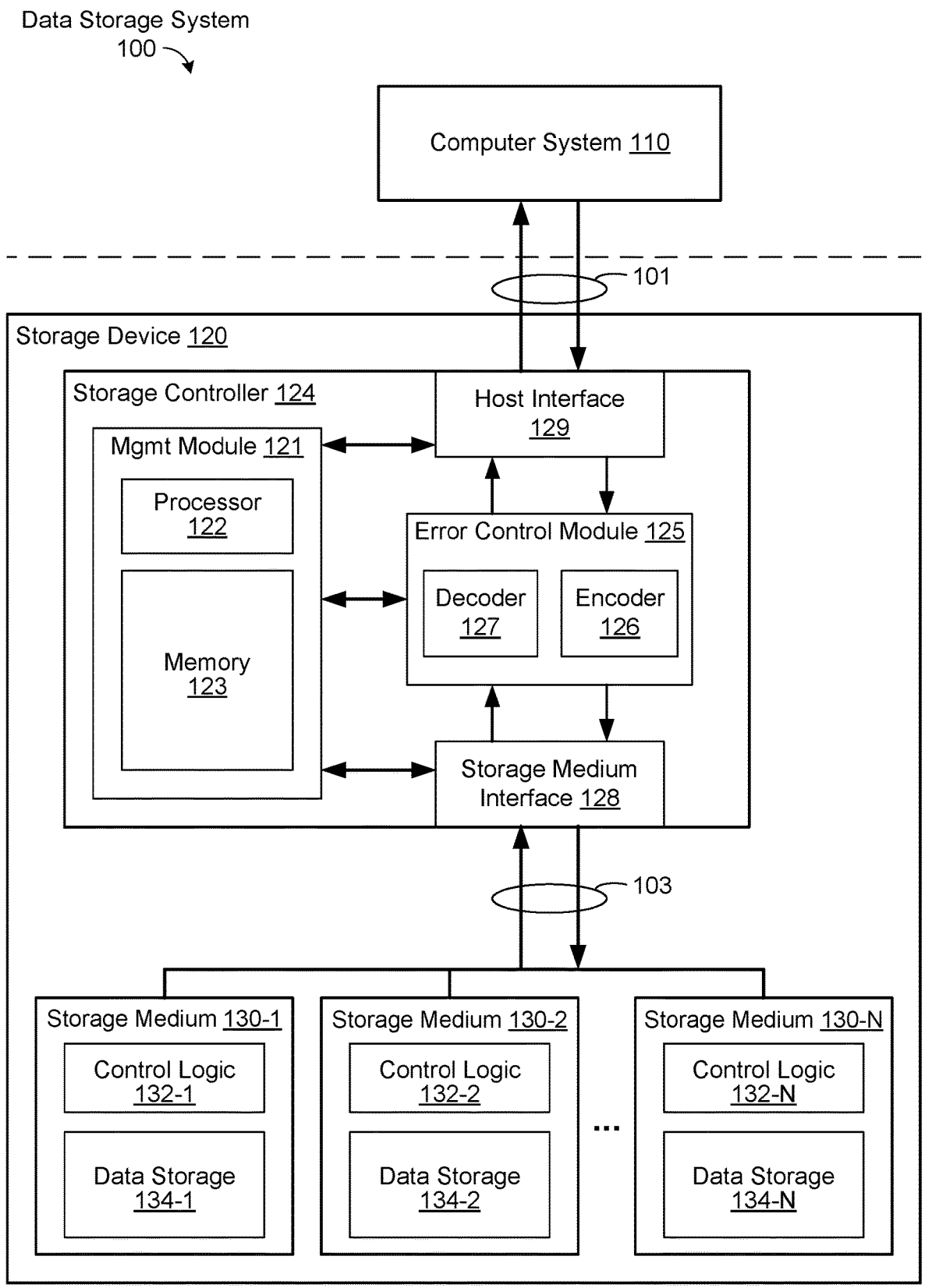
FIG. 1 is a block diagram of a data storage system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals are used to denote like features throughout the specification and figures.

DETAILED DESCRIPTION

The various implementations described herein include systems, methods and/or devices that transmit data from a host to a storage system through an interface link optimized for performance.

Numerous details are described herein in order to provide a thorough understanding of the example implementations illustrated in the accompanying drawings. However, the invention may be practiced without many of the specific details. And, well-known methods, components, and circuits have not been described in exhaustive detail so as not to unnecessarily obscure more pertinent aspects of the implementations described herein.

FIG. 1 is a diagram of an implementation of a data storage environment, namely data storage system 100. While certain specific features are illustrated, those skilled in the art will appreciate from the present disclosure that various other features have not been illustrated for the sake of brevity, and so as not to obscure more pertinent aspects of the example implementations disclosed herein. To that end, as a non-limiting example, the data storage system 100 includes a data processing system (alternatively referred to herein as a computer system or host) 110, and a storage device 120.

The computer system 110 is coupled to the storage device 120 through data connections 101. In various implementations, the computer system 110 includes the storage device 120 as a component. Generally, the computer system 110 includes any suitable computer device, such as a computer, a laptop computer, a tablet device, a netbook, an internet kiosk, a personal digital assistant, a mobile phone, a smart phone, a gaming device, a computer server, a peripheral component interconnect (PCI), a serial AT attachment (SATA), or any other computing device. In some implementations, the computer system 110 includes one or more processors, one or more types of memory, a display, and/or other user interface components such as a keyboard, a touch screen display, a mouse, a trackpad, a digital camera, and/or any number of supplemental devices to add functionality.

The storage device 120 includes one or more storage mediums 130 (e.g., N storage mediums 130, where N is an integer greater than or equal to 1). The storage medium(s) 130 are coupled to a storage controller 124 through data connections 103. In various implementations, the storage controller 124 and storage medium(s) 130 are included in the same device (e.g., storage device 120) as constituent components thereof, while in other embodiments, the storage controller 124 and storage medium(s) 130 are, or are in, separate devices. In some embodiments, the storage controller 124 is an application-specific integrated circuit (ASIC).

Each storage medium 130 includes control logic 132 and data storage 134. The data storage 134 may comprise any number (i.e., one or more) of memory devices including, without limitation, non-volatile semiconductor memory devices, such as flash memory. Flash memory devices can be configured for enterprise storage suitable for applications such as cloud computing, and/or configured for relatively smaller-scale applications such as personal flash drives or hard-disk replacements for personal, laptop and tablet computers.

In some implementations, the storage controller 124 includes a management module 121, an error control module 125, a storage medium interface 128, and a host interface 129. The host interface 129 couples the storage device 120 and its storage controller 124 to one or more computer systems 110, while the storage medium interface 128 couples the storage controller 124 to the storage medium(s) 130. In some implementations, the storage controller 124 includes various additional features that have not been illustrated for the sake of brevity, and so as not to obscure more pertinent features of the example implementations disclosed herein. As such, a different arrangement of features may be possible.

The host interface 129 typically includes data buffers (not shown) to buffer data being received and transmitted by the storage device 120 via the data connections 101. Similarly, the storage medium interface 128 provides an interface to the storage medium(s) 130 though the data connections 103. In some implementations, the storage medium interface 128 includes read and write circuitry.

The error control module 125 is coupled between the storage medium interface 128 and the host interface 129. In some implementations, the error control module 125 is provided to limit the number of uncorrectable errors inadvertently introduced into data. To that end, the error control module 125 includes an encoder 126 and a decoder 127. The encoder 126 encodes data to produce a codeword which is subsequently stored in a storage medium 130. When the encoded data is read from the storage medium 130, the decoder 127 applies a decoding process to recover the data and correct errors within the error correcting capability of the error control code. Various error control codes have different error detection and correction capacities, and particular codes are selected for various applications.

The management module 121 typically includes one or more processors 122 (sometimes referred to herein as CPUs, processing units, hardware processors, processors, microprocessors or microcontrollers) for executing modules, programs and/or instructions stored in memory and thereby performing processing operations. However, in some implementations, the processor(s) 122 are shared by one or more components within, and in some cases, beyond the function of the storage controller 124. The management module 121 is coupled by communication buses to the host interface 129, the error control module 125, and the storage medium interface 128 in order to coordinate the operation of these components.

The management module 121 also includes memory 123 (sometimes referred to herein as controller memory), and one or more communication buses for interconnecting the memory 123 with the processor(s) 122. Communication buses optionally include circuitry (sometimes called a chipset) that interconnects and controls communications between system components. The controller memory 123 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The controller memory 123 optionally includes one or more storage devices remotely located from the one or more processors 122. In some embodiments, the controller memory 123, or alternatively the non-volatile memory device(s) within the controller memory 123, comprises a non-transitory computer readable storage medium. In some embodiments, the controller memory 123, or the non-transitory computer readable storage medium of the controller memory 123, stores the programs, modules, and/or data structures, or a subset or superset thereof, for performing one or more of the operations described in this application with regard to any of the components associated with the storage controller 124.

In some embodiments, the various operations described in this application correspond to sets of instructions for performing the corresponding functions. These sets of instructions (i.e., modules or programs) need not be implemented as separate software programs, procedures or modules, and thus various subsets of these modules may be combined or otherwise re-arranged in various embodiments. In some embodiments, the memory 123 may store a subset of modules and data structures. Furthermore, the memory 123 may store additional modules and data structures. In some embodiments, the programs, modules, and data structures stored in the memory 123, or the non-transitory computer readable storage medium of the memory 123, provide instructions for implementing any of the methods described below. Stated another way, the programs or modules stored in the memory 123, when executed by the one or more processors 122, cause the storage device 120 to perform any of the operations described below. Although FIG. 1 shows various modules, FIG. 1 is intended more as functional description of the various features which may be present in the modules than as a structural schematic of the embodiments described herein. In practice, the programs, modules, and data structures shown separately could be combined, and some programs, modules, and data structures could be separated.

Figure 2:
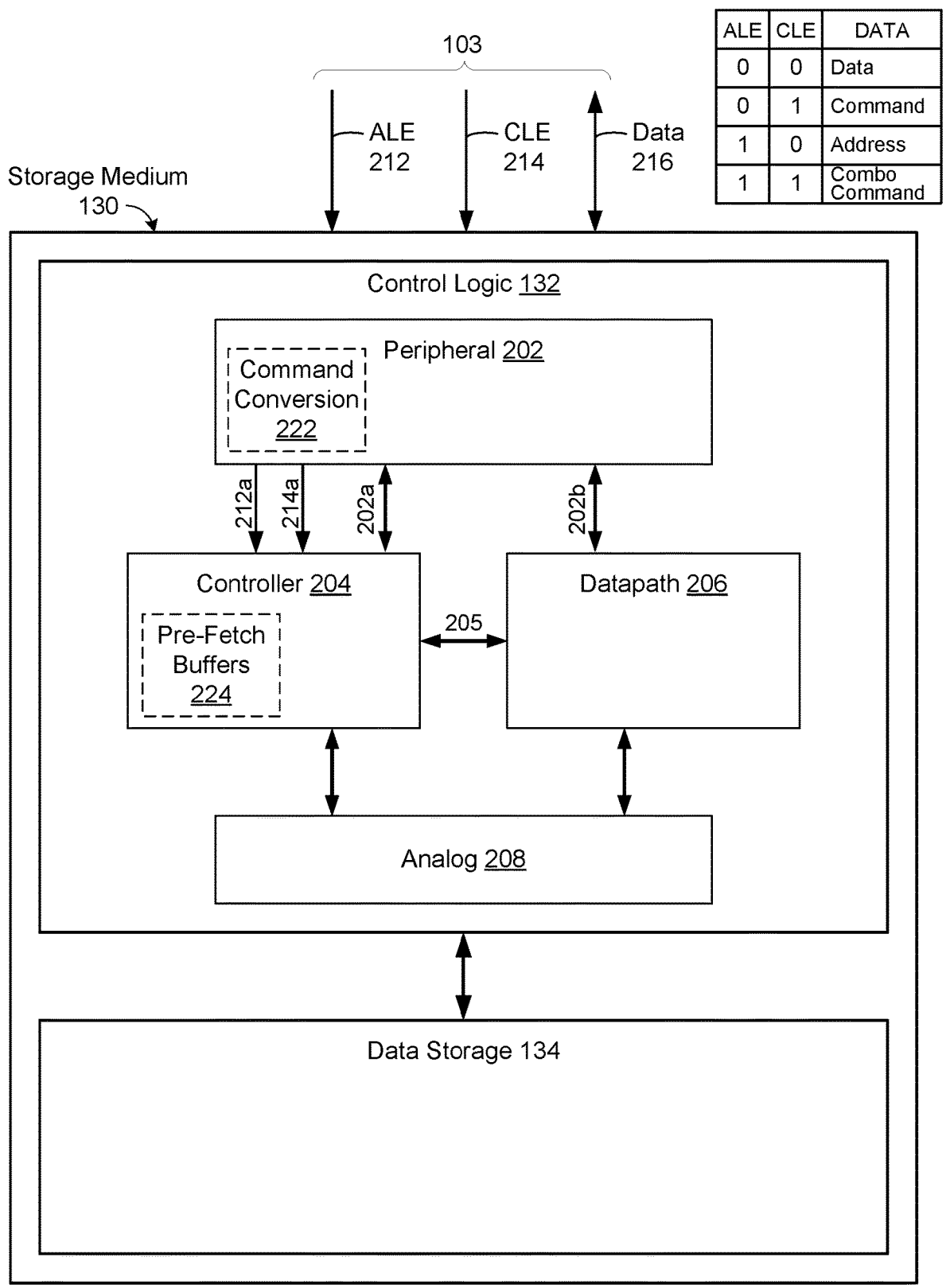
FIG. 2 is a block diagram of a command processing system in accordance with some embodiments.

FIG. 2 is a diagram of an implementation of a storage medium 130 as introduced above with reference to FIG. 1 (features shared with FIG. 1 are similarly numbered). While certain specific features are illustrated, those skilled in the art will appreciate from the present disclosure that various other features have not been illustrated for the sake of brevity, and so as not to obscure more pertinent aspects of the example implementations disclosed herein. To that end, as a non-limiting example, the storage medium 130 includes control logic 132 and data storage 134.

The control logic 132 comprises interface circuitry 202, a controller module 204, datapath circuitry 206, and analog circuitry 208. The interface circuitry 202 (sometimes referred to herein as the command interface) receives data and control signals transmitted by the storage controller 124 (FIG. 1) through the data connections 103 (e.g., as part of read, write, and erase instructions), and transmits data to the storage controller 124 (e.g., data read from the data storage 134). The controller module 204 (sometimes referred to herein as the memory controller) processes control signals and data received from the storage controller 124 and executes system operations (e.g., temperature acquisition) and memory operations (e.g., read, write, erase) specified by the control signals and data. The datapath circuitry 206 (sometimes referred to herein as the datapath) is a collection of functional units (e.g., arithmetic logic units, multipliers, registers, buses) that perform data processing operations as part of the implementation of the system operations and the memory operations specified for execution by the memory controller 204. The analog circuitry 208 (sometimes referred to herein as the analog) is a collection of voltage and/or current circuits (e.g., charge pumps, converters) for providing particular read, write, and erase voltage levels and/or current levels necessary for performing the various memory operations specified for execution by the memory controller 204.

In some implementations, the memory controller 204 is communicatively coupled to memory (sometimes referred to herein as controller memory). The controller memory includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the controller memory comprises a non-transitory computer readable storage medium. In some embodiments, the controller memory, or the non-transitory computer readable storage medium of the controller memory, stores the programs, modules, and/or data structures, or a subset or superset thereof, for performing one or more of the operations described in this application with regard to any of the components associated with the storage medium 130.

In some embodiments, the various operations described in this application correspond to sets of instructions for performing the corresponding functions. These sets of instructions (i.e., modules or programs) need not be implemented as separate software programs, procedures or modules, and thus various subsets of these modules may be combined or otherwise re-arranged in various embodiments. In some embodiments, the controller memory may store a subset of modules and data structures. Furthermore, the controller memory may store additional modules and data structures. In some embodiments, the programs, modules, and data structures stored in the controller memory, or the non-transitory computer readable storage medium of the controller memory, provide instructions for implementing any of the methods described herein. Stated another way, the programs or modules stored in the controller memory, when executed by the one or more processors associated with the memory controller 204, cause the storage medium 130 to perform any of the operations described herein. Although FIG. 2 shows various modules, FIG. 2 is intended more as functional description of the various features which may be present in the modules than as a structural schematic of the embodiments described herein. In practice, the programs, modules, and data structures shown separately could be combined, and some programs, modules, and data structures could be separated.

The data storage 134 comprises one or more memory devices. In some implementations, the memory devices are flash memory devices, and the data storage 134 comprises at least one of NAND-type flash memory and/or NOR-type flash memory. The data storage 134 is often divided into a number of addressable and individually selectable blocks, referred to herein as selectable portions. In some implementations, for flash memory, the individually selectable blocks are the minimum erasable units in a flash memory device. In other words, each block contains a minimum number of memory cells that can be erased simultaneously. Each block is usually further divided into a plurality of pages, where each page is typically an instance of a minimum unit of the smallest individually accessible sub-block in the block. However, in some implementations (e.g., in some types of flash memory), the minimum unit of individually accessible data is a sector, which is a subset of a page. That is, each page contains a plurality of sectors and each sector is the minimum unit of individually accessible data for writing data to or reading data from the flash memory device.

For the sake of notation only, a block of data includes a plurality of pages, typically a fixed number of pages per block, and each page includes a plurality of sectors, typically a fixed number of sectors per page. For example, in some implementations, one block includes 64 pages, 128 pages, 256 pages, or another suitable number of pages. The respective sizes of blocks, pages and sectors are often a matter of design choice or end-user choice, and often differ across a wide range of enterprise and consumer devices. However, for example only, and without limitation, in some enterprise applications a page includes 2K (i.e., 2048) to 16K bytes, and a sector includes anywhere from 256 bytes to 544 bytes. Those ranges may be extended upward or downward, and/or shrink or expand depending on a particular application. In some embodiments, each page stores one or more codewords, where a codeword is the smallest unit of data that is separately encoded and decoded by the encoder and decoder mechanisms of a particular device.

In some implementations, the memory devices included in the data storage 134 are subject to various memory and/or system operations specified by the storage controller 124 and/or the memory controller 204. The command interface 202 receives operations and data specified by the storage controller 124 through the data connections 103. In some implementations, the command interface sequentially receives strings of data 216 having a fixed number of bits. For example, the command interface receives 1 byte of data at a time (8 bits). Data strings comprising more than 8 bits and less than 8 bits are also possible.

In some implementations, in addition to receiving the data strings 216, the command interface 202 also receives one or more signals specifying the type of the data string. For example, the signal(s) may specify that the data string 216 represents (i) data to be written, (ii) a command specifying an operation, or (iii) an address of a selectable portion of the data stored in the data storage 134.

In some implementations, the command interface 202 receives data strings 216 comprising 8 bits, and two signals each comprising 1 bit. Respective signal bits correspond with respective data strings. In some implementations, one signal is an address latch enable (ALE) signal 212, and another signal is a command latch enable (CLE) signal 214. The ALE signal 212, when asserted (e.g., binary "1"), specifies that the presently received data string 216 represents an address. The CLE signal 214, when asserted (e.g., binary "1"), specifies that the presently received data string 216 represents a command. When neither of the ALE 212 or CLE 214 signals are asserted (e.g., both binary "0"), this specifies that the presently received data string 216 represents data. These signal settings are examples, and other settings may be implemented without departing from the scope of the inventive concepts described herein. In some implementations, when ALE 212 and/or CLE 214 are asserted, the command interface 202 routes the data string 216 to the memory controller 204 for further processing (sometimes referred to herein as "command phase" processing). In some implementations, when both ALE 212 and CLE 214 are not asserted, the command interface 202 routes the data string 216 to the datapath 206 for further processing (sometimes referred to herein as "data phase" processing).

Figures 3A, 3B:
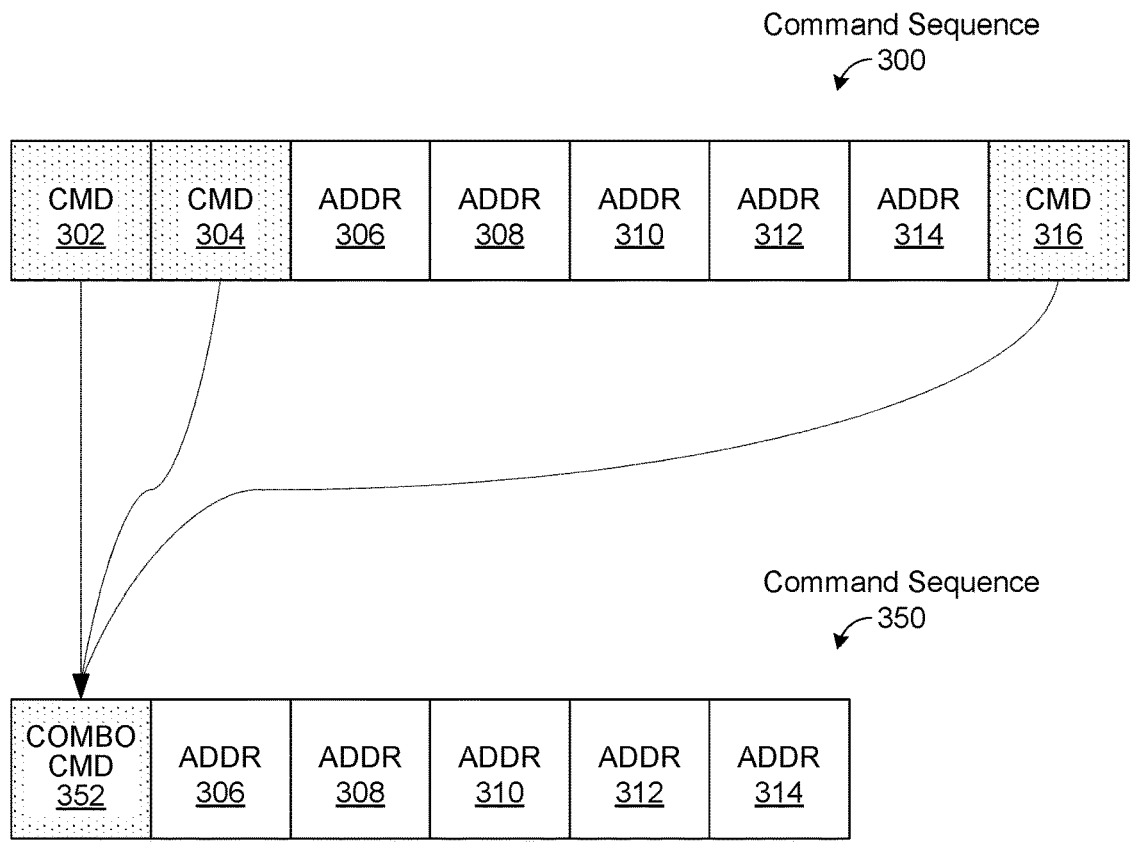
FIGS. 3A-3B are diagrams depicting command sequences in accordance with some embodiments.

FIG. 3A depicts an example command sequence 300. The command sequence 300 comprises a first command 302, a second command 304, five addresses 306-314, and a third command 316. Commands received before addresses in a sequence are sometimes referred to as prefix commands, and commands received after addresses in a sequence are sometimes referred to as postfix commands. Each command and address represents an individual data string (e.g., having 8 bits). Stated another way, each string of data (represented in the figure as blocks 302 through 316), whether the data represents a command or an address, is sequentially received by the command interface 202 in the order presented in the figure.

Each individual string of data 302-316 takes a nonzero amount of time to be received and processed. For purposes of this discussion, the amount of time is expressed in clock cycles. However, other ways to express processing time are possible, and the choice of clock cycles is not meant to be limiting. Assuming each string of data 302-316 takes 1 clock cycle to be received and/or processed, it takes 8 cycles for the command interface 202 to receive the postfix command 316. Sometimes postfix command depend on the addresses that come before them. Other times, however, there is no such dependency. In these scenarios, the total time it takes to receive and process a command sequence may be reduced by combining two or more commands in the sequence into a single combination command 352, as depicted in the example command sequence 350. The command sequence 350 comprises a single combination command 352, followed by the five address strings 306-314 as described with reference to the command sequence 300. While this disclosure uses the term "combining" to describe combination commands, other terms such as integrating, parsing, and replacing also apply.

FIG. 3B is a table showing example commands associated with the data strings 302, 304, 316, and 352. These examples are solely for the purpose of discussion and are not meant to be limiting. Other commands and combinations of commands may be implemented without departing from the scope of the inventive concepts described herein. In this example, the command sequence 300 includes two prefix commands 302 and 304, both read commands associated with the addresses 306 through 314. The command sequence 300 includes a postfix command 316, which instructs the memory controller 204 to execute a temperature acquisition operation. This postfix command does not require the addresses 306-314 to be decoded prior to the command being executed. As such, it would have been more efficient for the command interface 202 to have received this command before receiving the addresses, rather than receiving the command 7 clock cycles later.

Figure 4A:
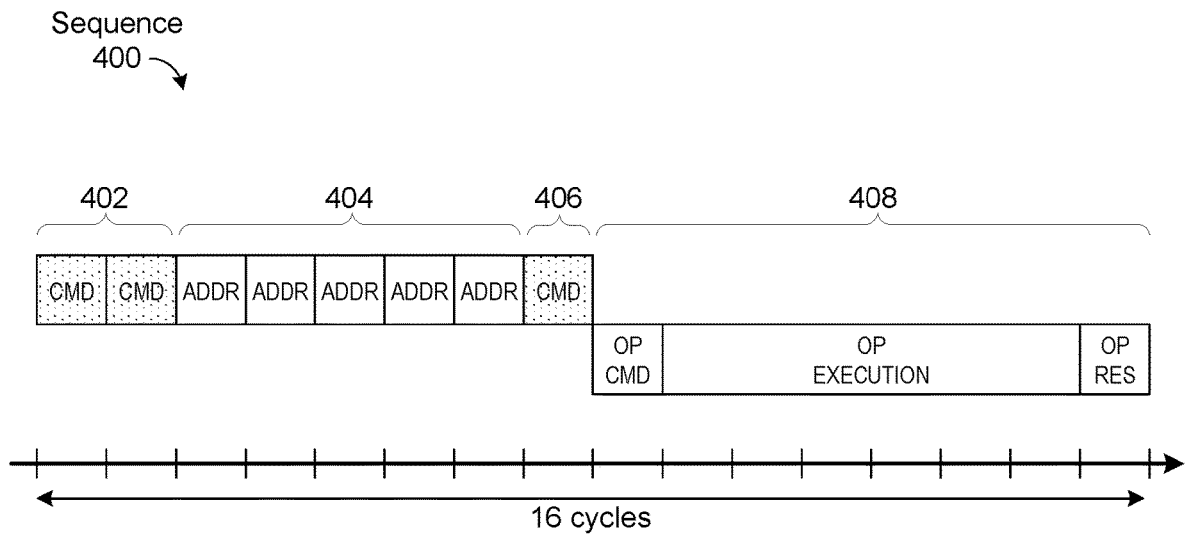
FIGS. 4A-4B are a diagrams depicting command sequence timing in accordance with some embodiments.
Figure 4B:
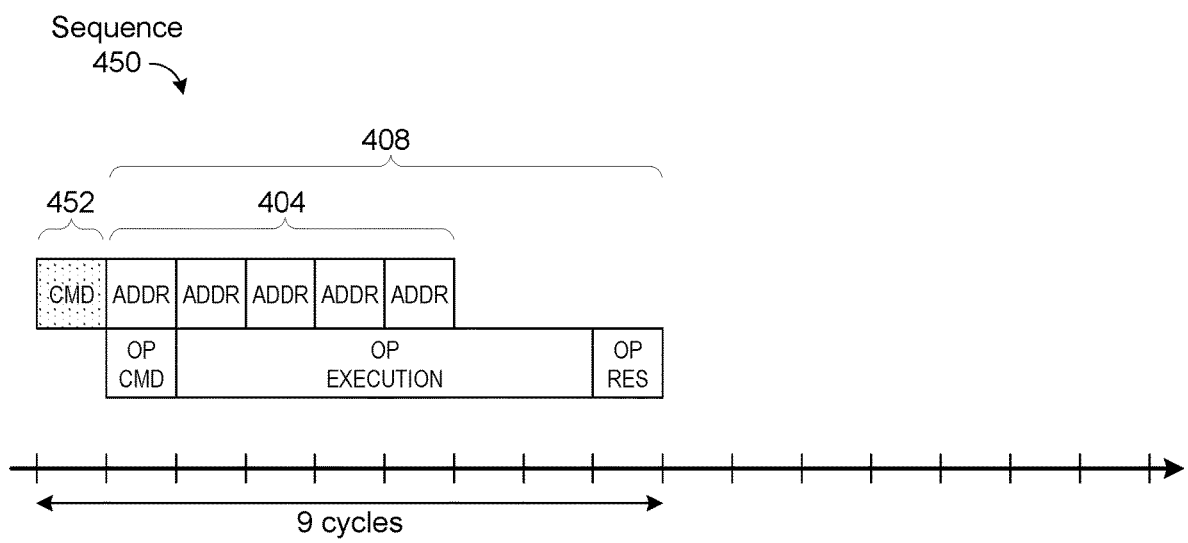

FIGS. 4A and 4B depict timing sequences 400 and 450 corresponding to commands 300 and 350, respectively.

Referring to FIG. 4A, in timing sequence 400, the command interface 202 receives (i) two prefix commands during a time period 402 of 2 clock cycles, (ii) five addresses during a time period 404 of 5 clock cycles, (iii) and a postfix command during a time period 406 of 1 clock cycle. The memory controller 204 executes the postfix command during a time period 408 lasting 8 clock cycles. The entire sequence lasts 16 clock cycles.

Applying the example described above with reference to FIG. 3B, the postfix command is a temperature acquisition command, which is not received and processed until the 8th clock cycle. Starting with the 9th clock cycle, the memory controller 204 processes the command (start temperature acquiring), which is following by a 6-cycle execution phase (temperature acquiring phase), and finally a 1-cycle process resolution (acquired temperature value received by the memory controller).

Referring to FIG. 4B, in timing sequence 450, by combining all three commands (received during time periods 402 and 406) into a single combination command (received during a 1-cycle time period 452), the entire command sequence is received and processed in only 6 clock cycles, and the memory controller 204 can execute the operation specified by the postfix command starting in the second clock cycle. As such, the entire sequence 450 is complete in 9 cycles (compared to 16 cycles for sequence 400 in FIG. 4A).

As discussed above, the combination command represents a plurality of commands (sometimes referred to herein as sub-commands). The sub-commands are identified by the data string associated with the combination command. In some implementations, in order to signal a combination command, the storage controller 124 asserts both the ALE 212 and CLE 214 signals (e.g., both binary "1"). When the command interface 202 receives a string of data 216 and both ALE 212 and CLE 214 signals are asserted, the command interface 202 processes the data string as a combination command. In some implementations, processing the data string as a combination command comprises obtaining one or more sub-commands based on a combination command identifier.

FIG. 5 depicts an example relationship between combination command identifiers 502 and corresponding command sequences 504. In some implementations, these relationships are stored in read only memory (ROM) accessible by the control logic 132. When the command interface 202 identifies an incoming data string as a combination command, the command interface 202, or the memory controller 204, obtains the sub-commands associated with the command sequences 504 based on the combination command identifier represented in the data string. For example, the data string represents an integer (e.g., "4") and the memory controller 204 consults a table stored in ROM to obtain five sub-commands (e.g., the commands specified in the fourth row of the table in FIG. 5). Of course, the table entries and associated identifiers are nonlimiting examples for the purpose of discussion; other command sequences and identifiers may be implemented without departing from the scope of the inventive concepts described herein.

Returning to FIG. 2, as discussed above, the storage controller 124 signals that a data string 216 represents a combination command by asserting both ALE 212 and CLE 214. Alternatively, the storage controller 124 (i) asserts only the CLE 214 signal (signaling a single command) and (ii) sets a configuration bit included in a command conversion module 222 included in the command interface 202, in order to specify that the command is a combination command. When only the CLE 214 signal is asserted, the command interface would normally interpret the data string 216 to be a single command (not a combination command). However, when the storage controller 124 sets the configuration bit, the command conversion module 222 signals to the memory controller 204 that the data string 216 is actually a combination command.

The command interface communicates to the memory controller 204 that a data string 216 represents a combination command by routing the data string 216 to the controller 204 (e.g., through path 202a) while asserting intermediate ALE and CLE signals 212a and 214a, respectively. When both ALE 212 and CLE 214 are both asserted, the command interface 202 asserts both intermediate ALE 212a and intermediate CLE 214a. For scenarios in which the storage controller asserts (i) only the CLE 214 signal, and (ii) the configuration bit, the command interface asserts both the intermediate ALE 212a and the intermediate CLE 214a signals, signaling a combination command.

In some implementations, the memory controller 204 includes a command/address router (not shown) which routes incoming data strings 216/202a to command processing circuitry or address processing circuitry based on whether the CLE 214 or ALE 212, respectively, are asserted. When both CLE 214 and ALE 212 are asserted, or when CLE 214 and the configuration bit are asserted, the command/address router routes the incoming data string 216/202a to the command circuitry for processing sub-commands.

In some implementations, the memory controller 204 executes the command and address data on data stored in the data storage 134 (e.g., a read operation), or on data to be stored in the data storage 134 (e.g., a write operation). The storage controller 124 transmits the data through the data connections 103 and signals that the data is for storage (e.g., as part of a write command) by signaling a binary "0" for both the ALE 212 and CLE 214. The command interface 202 routes such data to the datapath 206 (e.g., through path 202b). The datapath 206 routes the data to a specific address specified by the memory controller 204 (e.g., through path 205) for storage in the data storage 134.

Figure 6:
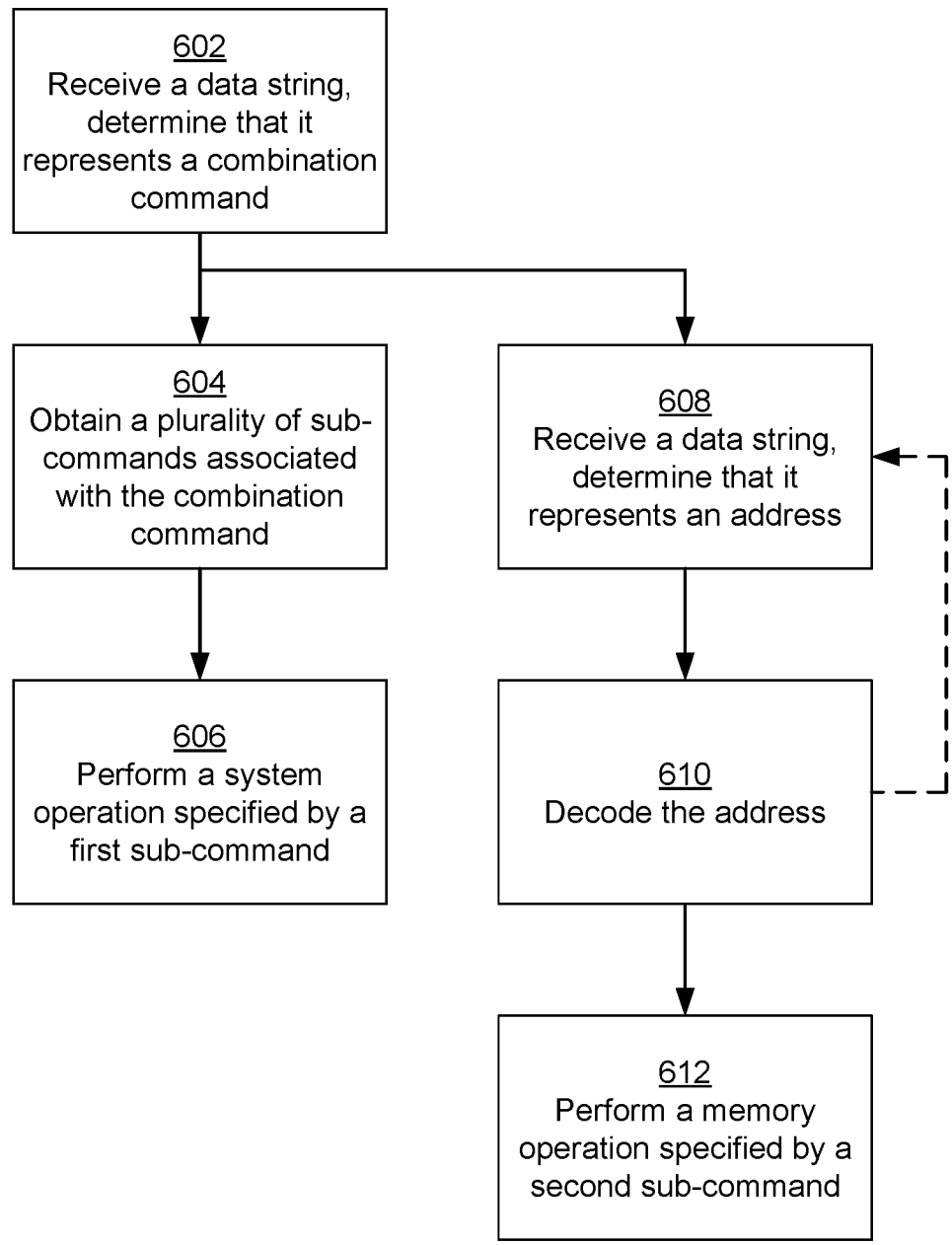
FIG. 6 is a method of processing command sequences in accordance with some embodiments.

FIG. 6 is a flow diagram of a method 600 for processing data strings in accordance with some implementations. The method may be performed by control logic 132 of a storage medium 130 (e.g., by a command interface 202 and/or memory controller 204). In some implementations, the control logic 132 may have one or more processors and memory storing one or more programs for execution by the one or more processors, and the one or more programs may include instructions for performing one or more of the operations of the method 600. In some implementations, the control logic 132 includes analog circuitry for performing one or more of the operations of the method 600.

The method begins when the command interface 202 receives (602) a data string, and determines (e.g., based on the ALE and CLE signals) that the data string represents a combination command (e.g., command 352, FIG. 3A; command 452, FIG. 4B). In accordance with the determination, the command interface 202 routes the data string to the memory controller 204, which decodes the combination command and obtains (604) a plurality of sub-commands associated with the combination command. For example, the memory controller decodes a combination command identifier (e.g., 502, FIG. 5) from the combination command, matches the identifier with a plurality of sub-commands associated with a command sequence (e.g., 504, FIG. 5). The memory controller 204 performs (606) a system operation specified by one of the sub-commands (e.g., operation 408, FIG. 4B).

While the memory controller 204 is obtaining the sub-commands and/or performing the operation (steps 604 and/or 606), the command interface 202 receives (608) another data string, and determines (e.g., based on the ALE signal) that the data string represents an address (e.g., an address 404, FIG. 4B). In accordance with the determination, the command interface 202 routes the data string to the datapath 206, which decodes (610) the address and performs (612), or causes to be performed, a memory operation specified by another of the obtained sub-commands. For example, a second sub-command is a read command, and the memory operation comprises executing a read command on a selectable data storage device stored in the data storage 134, wherein the selectable data storage device is specified by the decoded address. Importantly, at least one of steps 604 and 606 is performed in parallel with at least one of steps 608, 610, and 612, thereby saving processing time (e.g., processing operations over fewer clock cycles) and resulting in more efficient control logic 132 and quicker memory operation times (e.g., quicker read times).

In some implementations, the memory controller 204 includes one or more pre-fetch buffers. The one or more pre-fetch buffer(s) 224 are associated with one or more decoder(s) configured to fetch data, decode the data, and store the data before the memory controller 204 can operate on the data. In some implementations, while the memory controller 204 is processing a particular command sequence (e.g., sequence 350 in FIG. 3A), the memory controller pre-fetches another command sequence, referred to as the next command sequence (e.g., another sequence 350), from the storage controller 124, decodes one or more of the commands in that sequence, and stores the decoded commands in a pre-fetch command buffer. That way, when the memory controller 202 has completed decoding and processing the command and address data of a particular sequence, the memory controller 202 can immediately (with no processing delay) begin processing the next sequence without first having to wait for the next command sequence to be received from the storage controller 124 and decoded.

In some implementations, in addition to or as an alternative to decoding the commands associated with the pre-fetched sequence, the memory controller 204 decodes one or more of the addresses in that sequence, and stores the decoded addresses in a pre-fetch address buffer. That way, when the memory controller 202 has completed decoding and processing the command and address data of a particular sequence, the memory controller 202 can immediately (with no processing delay) begin processing the next sequence without first having to wait for the addresses in that next sequence to be decoded.

In some implementations, the memory controller 204 processes one or more operation parameters based on the pre-fetched and decoded command and/or address data, and stores the operation parameters in an operation parameter buffer. An example of an operation parameter is a particular read voltage level corresponding to a read command associated with a particular address in the data storage 134 (e.g., a particular read voltage level which should be applied to a particular storage device during the read operation). In some implementations, the read voltage is word line specific. Another example of an operation parameter is a timing value corresponding to a read command associated with a particular address in the data storage 134 (e.g., an amount of time during which the read voltage should be applied to a particular storage device during the read operation). As a result, when the memory controller 202 has completed decoding and processing the command and address data of a particular sequence, the memory controller 202 can immediately (with no processing delay) begin executing operations associated with the next sequence without first having to process operation parameters (e.g., the memory controller 202 can immediately apply the pre-processed read voltage to the pre-fetched memory address in order to execute the pre-fetched read command).

Figure 7:
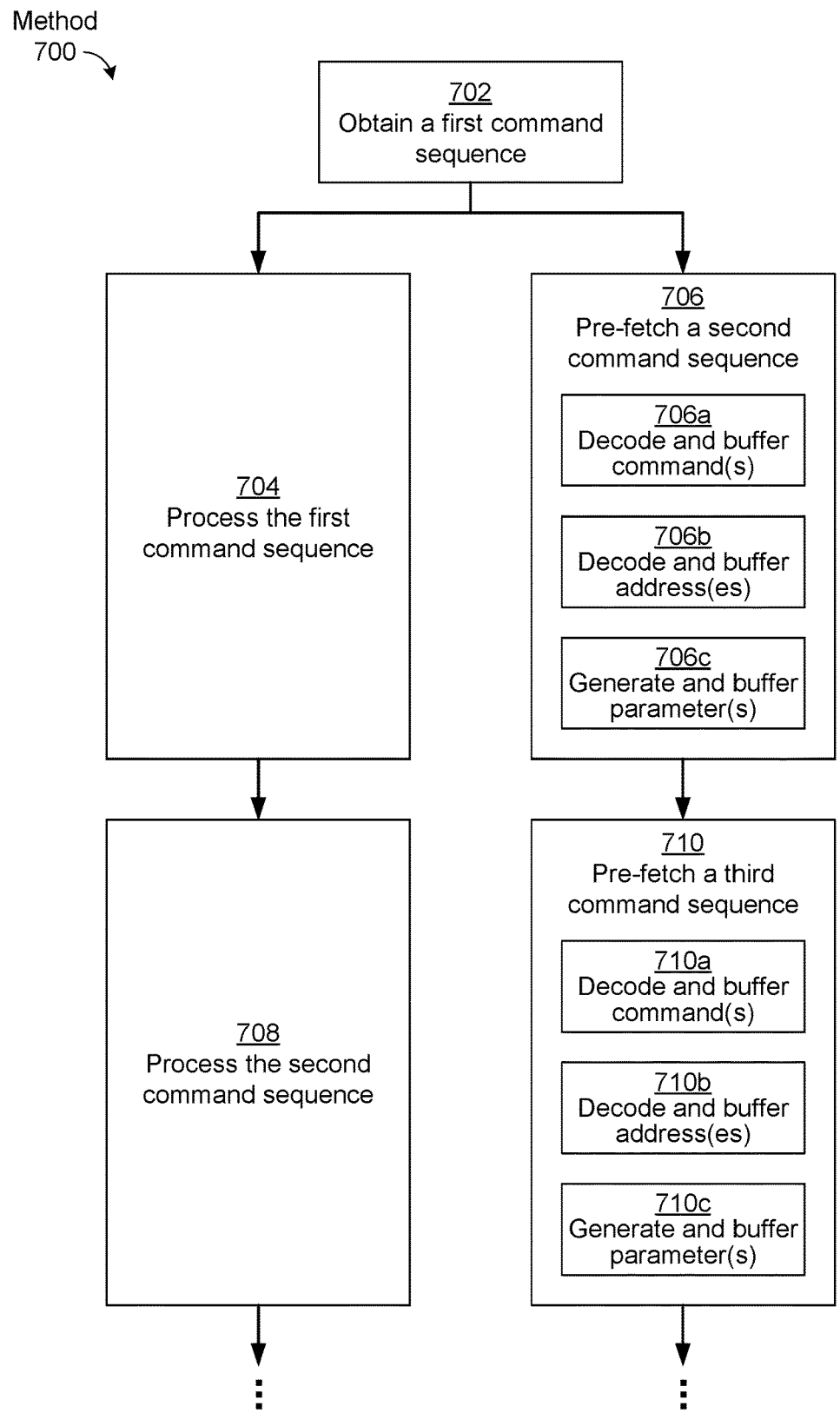
FIG. 7 is a method for processing data strings in accordance with some implementations.

FIG. 7 is a flow diagram of a method 700 for processing data strings in accordance with some implementations. The method may be performed by control logic 132 of a storage medium 130 (e.g., by a command interface 202 and/or memory controller 204). In some implementations, the control logic 132 may have one or more processors and memory storing one or more programs for execution by the one or more processors, and the one or more programs may include instructions for performing one or more of the operations of the method 700. In some implementations, the control logic 132 includes analog circuitry for performing one or more of the operations of the method 700.

The method begins when the memory controller 204 obtains (702) a first command sequence (e.g., by executing one or more of the operations described above with reference to FIG. 6). The memory controller 204 processes (704) the first command sequence (e.g., by decoding or otherwise obtaining one or more commands, addresses, and data, and performing one or more operations based on the decoded commands, addresses, and data as described above). While the memory controller 204 is processing the first command sequence, the memory controller pre-fetches (706) a second command sequence. In some implementations, the pre-fetching includes (706a) decoding (or otherwise obtaining) and buffering one or more commands, (706b) decoding (or otherwise obtaining) and buffering one or more addresses, and/or (706c) generating (or otherwise obtaining) and buffering one or more operation parameters based on a command sequence which the memory controller 204 is not yet ready to process, as described above with reference to the pre-fetch buffers 224.

Upon completion of the processing of the first command sequence, the memory controller 204 processes (708) the second command sequence using the buffered commands, addresses, and/or operation parameters obtained in step 706, thereby resulting in more efficient processing time, since the memory controller 204 does not need to wait for the commands, addresses, and/or operation parameters to be received (or otherwise obtained or generated) from the storage controller 124. While the memory controller 204 is processing the second command sequence, the memory controller 204 pre-fetches (710) a third command sequence (for processing upon completion of the second command sequence). In some implementations, the pre-fetching includes (710a) decoding (or otherwise obtaining) and buffering one or more commands, (710b) decoding (or otherwise obtaining) and buffering one or more addresses, and/or (710c) generating (or otherwise obtaining) and buffering one or more operation parameters based on a command sequence which the memory controller 204 is not yet ready to process, as described above with reference to the pre-fetch buffers 224.

The method continues as described above (processing current command sequences and pre-fetching subsequent command sequences in parallel with the processing of the current command sequences) until there are no more command sequences to process.

The features described above allow for system and memory operation time to be reduced substantially. For instance, combination commands allow for quicker decoding of operations (e.g., read times can be reduced by more than 500 ns). Moreover, the pre-fetching features described above allow for operations to be processed during execution of previous operations, thereby further reducing processing times. Each of these features enable a more efficient command interface by reducing the time required for command decoding, address decoding, operation parameter generation, and operation execution. For example, where a conventional read operation may have taken 5 microseconds to complete, a storage device with a more efficient command interface as described above could execute the same read operation in less than 1 microsecond.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the terms "about" and "approximately" may refer to + or −10% of the value referenced. For example, "about 9" is understood to encompass 8.1 and 9.9.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A data storage system, comprising:
a storage controller; and
a storage medium in communication with the storage controller, the storage medium including:
   a memory comprising a plurality of memory cells; and
   control logic in communication with the memory;
wherein the control logic of the storage medium is configured to:
   receive a first data string from the storage controller;
   determine a type of data represented by the first data string;
   in accordance with a determination that the first data string represents a combination command, decode a plurality of sub-commands from the first data string;
   receive a second data string from the storage controller, subsequent to receiving the first data string;
   determine a type of data represented by the second data string;
   in accordance with a determination that the second data string represents an address, decode an address from the second data string;
   while decoding the address;
      perform a system operation specified by a first sub-command of the plurality of sub-commands;
      fetch a subsequent data string;
      obtain a subsequent sub-command, a subsequent address, or a subsequent operation parameter based on the subsequent data string; and
      store the subsequent sub-command, the subsequent address, or the operation parameter in a buffer; and after decoding the address:
  perform a memory operation, specified by a second sub-command of the plurality of sub-commands, on one or more of the plurality of memory cells in accordance with the decoded address; and
  perform a system operation specified by the subsequent sub-command, a memory operation specified by the subsequent address, or a memory operation in accordance with the operation parameter.

2. The data storage system of claim 1, wherein:
the system operation is a temperature acquiring operation, a single level read/write operation, a multi-level read/write operation, a plurality of read/write operations, independent plane read/write and/or asynchronous independent plane read/write; and
the memory operation is a read, write, or erase operation related to the decoded address.

3. The data storage system of claim 1, wherein decoding the plurality of sub-commands from the first data string comprises:
matching the combination command with the plurality of sub-commands using a table of combination commands and corresponding pluralities of sub-commands.

4. The data storage system of claim 1, wherein:
the first sub-command of the plurality of sub-commands is a postfix command; and
the second sub-command of the plurality of sub-commands is a prefix command.

5. The data storage system of claim 1, wherein the control logic is further configured to:
receive a command latch enable (CLE) signal indicating that a received data string represents a command; and
receive an address latch enable (ALE) signal indicating that a received data string represents an address.

6. The data storage system of claim 5, wherein the control logic is configured to determine that the first data string represents a combination command based on concurrent receipt of the CLE signal and the ALE signal.

7. A method of performing operations at a data storage system including a storage controller and a storage medium in communication with the storage controller, the storage medium including a memory comprising a plurality of memory cells and control logic in communication with the memory, the method comprising, at the control logic of the storage medium:
receiving a first data string from the storage controller;
determining a type of data represented by the first data string;
in accordance with a determination that the first data string represents a combination command, decoding a plurality of sub-commands from the first data string;
receiving a second data string from the storage controller, subsequent to receiving the first data string;
determining a type of data represented by the second data string;
in accordance with a determination that the second data string represents an address, decoding an address from the second data string;
while decoding the address;
  performing a system operation specified by a first sub-command of the plurality of sub-commands;
  fetching a subsequent data string;
  obtaining a subsequent sub-command, a subsequent address, or a subsequent operation parameter based on the subsequent data string; and
  storing the subsequent sub-command, the subsequent address, or the operation parameter in a buffer; and
after decoding the address:
  performing a memory operation, specified by a second sub-command of the plurality of sub-commands, on one or more of the plurality of memory cells in accordance with the decoded address; and
  performing a system operation specified by the subsequent sub-command, a memory operation specified by the subsequent address, or a memory operation in accordance with the operation parameter.

8. The method of claim 7, wherein:
the system operation is a temperature acquiring operation, a single level read/write operation, a multi-level read/write operation, a plurality of read/write operations, independent plane read/write and/or asynchronous independent plane read/write; and
the memory operation is a read, write, or erase operation related to the decoded address .

9. The method of claim 7, wherein decoding the plurality of sub-commands from the first data string comprises:
matching the combination command with the plurality of sub-commands using a table of combination commands and corresponding pluralities of sub-commands.

10. The method of claim 7, wherein:
the first sub-command of the plurality of sub-commands is a postfix command; and
the second sub-command of the plurality of sub-commands is a prefix command.

11. The method of claim 7, further comprising:
receiving a command latch enable (CLE) signal indicating that a received data string represents a command; and
receiving an address latch enable (ALE) signal indicating that a received data string represents an address.

12. The method of claim 11, wherein the control logic is configured to determine that the first data string represents a combination command based on concurrent receipt of the CLE signal and the ALE signal.

13. A data storage system, comprising:
a storage controller; and
a storage medium in communication with the storage controller, the storage medium including:
  a memory including a plurality of memory cells; and
  control logic in communication with the memory;
wherein the control logic of the storage medium is comprises:
  receiving means for receiving data strings from the storage controller;
  data type determination means for determining one or more types of data represented by the received data strings;
  combination command means for, in accordance with a determination that a first received data string represents a combination command, decoding a plurality of sub-commands from the first received data string;
  address decoding means for, in accordance with a determination that a second received data string represents an address, decoding an address from the second received data string;
  system operation means for, while decoding the address, performing a system operation specified by a first sub-command of the plurality of sub-commands; and
  memory operation means for performing a memory operation, specified by a second sub- command of the plurality of sub-commands, on one or more of the plurality of memory cells in accordance with the decoded address;

wherein:

while the address decoding means decodes the address:

the receiving means receives a subsequent data string;

the combination command means obtains a subsequent sub-command based on the subsequent data string, or the address decoding means decodes a subsequent address based on the subsequent data string; and after the address decoding means decodes the address:

the system operation means performs a system operation specified by the subsequent sub-command, or the memory operation means performs a memory operation specified by the subsequent address.

14. The data storage system of claim 13, wherein decoding the plurality of sub-commands based on the first data string comprises:

matching the combination command with the plurality of sub-commands using a table of combination commands and corresponding pluralities of sub-commands.

\* \* \* \* \*